(12) United States Patent
Zhang et al.

(10) Patent No.: US 11,403,146 B2
(45) Date of Patent: Aug. 2, 2022

(54) METHOD, APPARATUS, AND SERVER FOR MANAGING IMAGE ACROSS CLOUD SERVERS

(71) Applicant: HUAWEI CLOUD COMPUTING TECHNOLOGIES CO., LTD., Gui'an New District (CN)

(72) Inventors: Sen Zhang, Shenzhen (CN); Fei Qi, Shenzhen (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 540 days.

(21) Appl. No.: 16/394,269

(22) Filed: Apr. 25, 2019

(65) Prior Publication Data

US 2019/0250960 A1    Aug. 15, 2019

Related U.S. Application Data

(63) Continuation of application No. PCT/CN2017/108195, filed on Oct. 28, 2017.

(30) Foreign Application Priority Data

Nov. 30, 2016   (CN) .................. 201611083399.X

(51) Int. Cl.
*G06F 9/00* (2006.01)
*G06F 9/50* (2006.01)
(Continued)

(52) U.S. Cl.
CPC .............. *G06F 9/5077* (2013.01); *G06F 8/63* (2013.01); *G06F 9/4401* (2013.01); *G06F 9/445* (2013.01);
(Continued)

(58) Field of Classification Search
CPC ........ G06F 9/5077; G06F 8/63; G06F 9/4401; G06F 9/445; G06F 9/455; G06F 9/45558;
(Continued)

(56) References Cited

U.S. PATENT DOCUMENTS 8,954,718 B1 * 2/2015 Raj ..................... G06F 9/45545
713/1
8,990,809 B1 * 3/2015 Jacob ....................... G06F 8/61
718/1
(Continued)

FOREIGN PATENT DOCUMENTS

CN     103729211 A     4/2014
CN     104156257 A     11/2014
(Continued)

*Primary Examiner* — Volvick Derose
(74) *Attorney, Agent, or Firm* — Womble Bond Dickinson (US) LLP

(57) ABSTRACT

A method, an apparatus, and a server for managing an image across cloud servers relate to the field of computer technologies. The method includes: obtaining layered image information of a layered image file of a service virtual machine on a second cloud server; creating a boot partition and a rootfs partition based on a pre-created installer virtual machine and the layered image information; and creating, based on the boot partition and the rootfs partition, an image corresponding to the service virtual machine. In this method, no manual operation is required, and not only reducing management costs, but also improving management efficiency.

11 Claims, 9 Drawing Sheets

(51) Int. Cl.
*G06F 9/4401* (2018.01)
*G06F 9/455* (2018.01)
*G06F 8/61* (2018.01)
*G06F 9/445* (2018.01)

(52) U.S. Cl.
CPC .......... *G06F 9/455* (2013.01); *G06F 9/45558* (2013.01); *G06F 2009/45562* (2013.01); *G06F 2009/45575* (2013.01)

(58) Field of Classification Search
CPC . G06F 2009/45562; G06F 2009/45575; G06F 9/5072; G06F 2009/45583
USPC ............................................................ 713/1
See application file for complete search history.

(56) References Cited

U.S. PATENT DOCUMENTS

| | | | | |
|---|---|---|---|---|
| 2003/0009657 | A1* | 1/2003 | French | H04L 41/0213 713/2 |
| 2003/0014621 | A1* | 1/2003 | French | G06F 9/4416 713/2 |
| 2005/0038880 | A1* | 2/2005 | Danforth | H04L 67/34 709/222 |
| 2010/0325406 | A1* | 12/2010 | Ukeda | G06F 9/4416 713/2 |
| 2011/0055299 | A1* | 3/2011 | Phillips | G06F 9/45533 707/827 |
| 2011/0119348 | A1* | 5/2011 | Gibbons | G06F 8/63 709/217 |
| 2012/0278599 | A1* | 11/2012 | Nilakantan | H04L 41/0806 713/2 |
| 2013/0212161 | A1* | 8/2013 | Ben-Shaul | G06F 16/178 709/203 |
| 2015/0113531 | A1* | 4/2015 | Lv | G06F 9/4856 718/1 |
| 2015/0381435 | A1 | 12/2015 | Todd et al. | |
| 2016/0019085 | A1* | 1/2016 | Khandekar | G06F 9/45558 718/1 |
| 2017/0083541 | A1* | 3/2017 | Mann | G06F 16/119 |
| 2018/0196654 | A1 | 7/2018 | Bo et al. | |

FOREIGN PATENT DOCUMENTS

| | | |
|---|---|---|
| CN | 104461785 A | 3/2015 |
| CN | 104572274 A | 4/2015 |
| CN | 105138389 A | 12/2015 |
| CN | 105159760 A | 12/2015 |
| CN | 105426227 A | 3/2016 |
| CN | 105511943 A | 4/2016 |
| EP | 2905700 A1 | 8/2015 |

* cited by examiner

METHOD, APPARATUS, AND SERVER FOR MANAGING IMAGE ACROSS CLOUD SERVERS

CROSS-REFERENCE TO RELATED APPLICATIONS

This application is a continuation of International Application No. PCT/CN2017/108195, filed on Oct. 28, 2017, which claims priority to Chinese Patent Application No. 201611083399.X, field on Nov. 30, 2016. The disclosures of the aforementioned applications are hereby incorporated by reference in their entireties.

TECHNICAL FIELD

This disclosure relates to the field of computer technologies, and in particular, to a method, an apparatus, and a server for managing an image across cloud servers.

BACKGROUND

To reduce operational costs, an increasing number of enterprise users deploy test and production environments on cloud servers. Cloud servers include public cloud servers, private cloud servers, and the like. The private cloud servers have features such as higher security, a long deployment period, and high operational costs. The public cloud servers have features such as lower security, a short deployment period, and low operational costs. With respect to the features of the public cloud servers and the private cloud servers, to balance security and operational costs, many enterprise users use a hybrid cloud server solution in which services with a higher security requirement are deployed on the private cloud servers and services with a lower security requirement are deployed on the public cloud servers. However, because virtualization technologies used for different cloud servers are different, for a same service, when an image (the image is a type of redundancy, and refers to completely the same copy that is of a file of a disk and that is stored on another disk) of the service is deployed on different cloud servers, enterprise users need to use different image management policies for the different cloud servers. Therefore, how to implement image management across cloud servers is a problem that urgently needs to be resolved in a process of using a hybrid cloud server.

An existing method for managing an image across cloud servers is: After an enterprise user creates an image on a cloud server, if needing to deploy the image on another cloud server, the enterprise user manually re-creates the image on the another cloud server, so that the created image can run on the another cloud server.

In the foregoing process, the enterprise user needs to manually create a new image, and consequently management costs are increased.

SUMMARY

To resolve the problem in the prior art, embodiments of this disclosure provide a method, an apparatus, and a server for managing an image across cloud servers. The technical solutions are as follows:

According to a first aspect, a method for managing an image across cloud servers is provided. The method is applied to a first cloud server, and the method includes: obtaining, by the first cloud server, layered image information of a layered image file of a service virtual machine on a second cloud server; creating, by the first cloud server, a boot partition and a rootfs partition based on the layered image information by using a pre-created installer virtual machine; and creating, by the first cloud server, based on the boot partition and the rootfs partition, an image corresponding to the service virtual machine.

In the solution according to the embodiments of this disclosure, the first cloud server automatically creates, by using the pre-created installer virtual machine and the layered image information of the pre-created layered image file on the second cloud server, the image corresponding to the service virtual machine of the first cloud server, and no manual operation is required in this process, thereby not only reducing management costs, but also improving management efficiency.

With reference to the first aspect, in a first possible implementation of this disclosure, the creating a boot partition and a rootfs partition based on the layered image information by using a pre-created installation virtual machine includes:

loading and running, by the first cloud server, a RAM OS in a virtual disk of the installer virtual machine when the installer virtual machine is started; downloading, by the first cloud server, the layered image file based on the layered image information by using the installer virtual machine in a running process of the RAM OS; parsing, by the first cloud server, the layered image file by using the installer virtual machine, to obtain a kernel description file and an application layer image; downloading, by the first cloud server, a kernel module by using the installer virtual machine based on the kernel description file; configuring, by the first cloud server, the kernel module by using the installer virtual machine to obtain the boot partition; and decompressing, by the first cloud server, the application layer image by using the installer virtual machine to obtain the rootfs partition.

In the solution according to the embodiments of this disclosure, in the running process of the installer virtual machine, the layered image file is downloaded by using the installer virtual machine, and then the image file is processed, to obtain the boot partition and the rootfs partition required by the service virtual machine. This increases a speed of obtaining the boot partition and the rootfs partition.

With reference to the first aspect, in a second possible implementation of the first aspect, the image corresponding to the service virtual machine includes an image service virtual machine; and the creating, based on the boot partition and the rootfs partition, an image corresponding to the service virtual machine includes:

starting, by the first cloud server, the installer virtual machine based on the boot partition and the rootfs partition in a preset start mode, to obtain the image service virtual machine.

With reference to the first aspect, in a third possible implementation of the first aspect, the image corresponding to the service virtual machine includes an image file of the service virtual machine; and the creating, based on the boot partition and the rootfs partition, an image corresponding to the service virtual machine includes:

invoking, by a first cloud platform, a specified command from a volume in which the boot partition and the rootfs partition are located; and creating, by the first cloud platform, the image file of the service virtual machine according to the specified command.

In the solution according to the embodiments of this disclosure, methods of creating the image corresponding to the service virtual machine and the image file of the service virtual machine are provided with respect to use habits of different users, so that the created image corresponding to the service virtual machine can satisfy use requirements of users in different scenarios.

According to a second aspect, a method for managing an image across cloud servers is provided. The method is applied to a second cloud server, and the method includes: obtaining, by the second cloud server, an analysis result for a kernel module of a service virtual machine; generating a kernel description file based on the analysis result; obtaining, by the second cloud server, a rootfs partition and application layer information of the service virtual machine; generating, by the second cloud server, an application layer image based on the rootfs partition and the application layer information of the service virtual machine; and packaging, by the second cloud server, the kernel description file and the application layer image to obtain a layered image file, where the layered image file is used by a first cloud server to create an image corresponding to the service virtual machine.

In the solution according to the embodiments of this disclosure, the layered image file of the service virtual machine is pre-created, so that the second cloud server can create, based on the layered image file, the image corresponding to the service virtual machine. In this process, no manual operation is required, thereby not only reducing management costs, but also improving management efficiency.

With reference to the second aspect, in a first possible implementation of the second aspect, the obtaining an analysis result for a kernel module of a service virtual machine includes:

analyzing, by the second cloud server, the kernel module of the service virtual machine in a running process of the service virtual machine, to obtain the analysis result; or reading, by the second cloud server, kernel information from the image file of the service virtual machine and analyzing the kernel information, to obtain the analysis result.

With reference to the second aspect, in a second possible implementation of the second aspect, the obtaining a rootfs partition and application layer information of the service virtual machine includes:

scanning, by the second cloud server, the service virtual machine that is running, to obtain the rootfs partition and the application layer information of the service virtual machine; or reading, by the second cloud server, the rootfs partition and the application layer information of the service virtual machine from the image file of the service virtual machine.

According to a third aspect, an apparatus for managing an image across cloud servers is provided. The apparatus is a first cloud server, and the server includes units, for example, an obtaining unit, a partition unit and an image creation unit, configured to implement the method for managing an image across cloud servers according to the first aspect.

According to a fourth aspect, an apparatus for managing an image across cloud servers is provided. The apparatus is a second cloud server, and the server includes units, for example, a first obtaining unit, a file generation unit, a second obtaining unit and an application layer image generation unit, configured to implement the method for managing an image across cloud servers according to the second aspect.

According to a fifth aspect, a server for managing an image across cloud servers is provided, including: a processor, a memory, and a bus, where the memory and the processor are connected by using the bus, the memory is configured to store an executable instruction of the processor; and the processor is configured to perform the method for managing an image across cloud servers according to the first aspect. For details of operations performed by the processor, refer to the first aspect to the third possible implementation of the first aspect.

According to a sixth aspect, a server for managing an image across cloud servers is provided, including: a processor, a memory, and a bus, where the memory and the processor are connected by using the bus, the memory is configured to store an executable instruction of the processor; and the processor is configured to perform the method for managing an image across cloud servers according to the second aspect. For details of operations performed by the processor, refer to the second aspect to the second possible implementation of the second aspect.

According to a seventh aspect, a computer-readable storage medium is provided, configured to store program code executed by a server. The program code includes an instruction for performing the method according to the first aspect.

According to an eighth aspect, a computer-readable storage medium is provided, configured to store program code executed by a server. The program code includes an instruction for performing the method according to the second aspect.

The technical solutions provided in the embodiments of this disclosure have the following beneficial effects:

No manual operation is required, and the image corresponding to the service virtual machine of the first cloud server is created on the second cloud server by using the pre-created installer virtual machine and the layered image information of the pre-created layered image file on the first cloud server. This not only reduces management costs, but also improves management efficiency.

DESCRIPTION OF EMBODIMENTS

To make the objectives, technical solutions, and advantages of this disclosure clearer, the following further describes the implementations of this disclosure in detail with reference to the accompanying drawings.

In the field of computer technologies, cloud servers mainly include public cloud servers, private cloud servers, and the like. Because virtualization technologies used for different cloud servers are different, for a same service, images deployed on the public cloud servers and the private cloud servers are different. Currently, differences between the images on the public cloud servers and the private cloud services are as follows:

1. Image formats are different. Image formats used by the public cloud servers and the private cloud servers are different. For example, an image format used by an AWS (Amazon Web Services, Amazon public cloud service) may be an AMI (Amazon Machine Images, Amazon image service) image format, and an image format used by a private cloud server may be an OVF (Open Virtualization Format) format.

2. Virtualized drivers in kernel modules are different. Because virtualized applications installed on the public cloud servers and the private cloud servers are different, virtualized drivers corresponding to virtual hardware such as virtual central processing units (vCPU), virtual disks (vDisk), and virtual network and interface cards (vNic) of the public cloud servers and the private cloud servers are different.

3. Kernel optimization modules are different. Usually, for different virtualized applications, an operating system distributor installs a corresponding kernel optimization module in a kernel to improve performance of a virtual machine.

Figure 1:
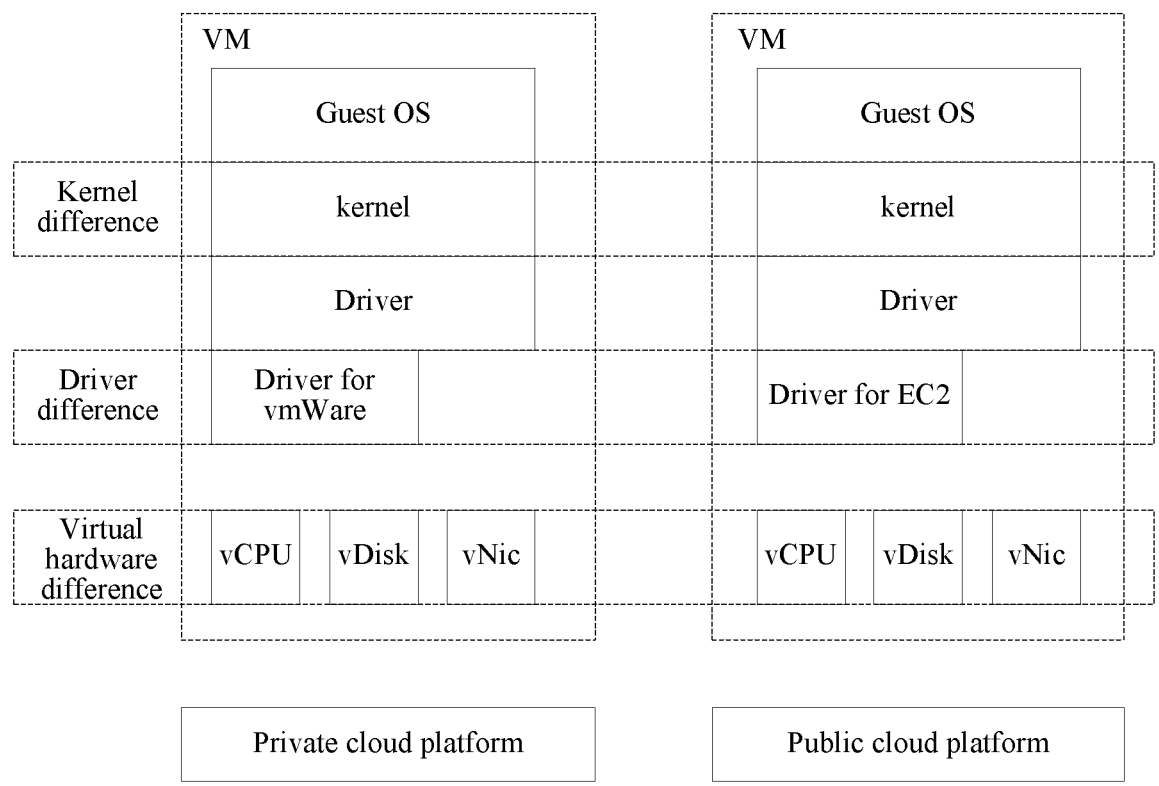
FIG. 1 is a schematic diagram of a difference between an image virtual machine on a public cloud server and an image virtual machine on a private cloud service.

As shown in FIG. 1, for image virtual machines deployed on an AWS and a private cloud server, because virtualization technologies used by the AWS and the private cloud server are different, virtual hardware devices are different. In addition, the difference between the virtual hardware devices leads to a difference between hardware drivers in operating systems, and further leads to a difference between kernel modules. That is, kernels, the hardware drivers and the kernel modules of the image virtual machines deployed on the AWS and the private cloud server are different.

Figure 2:
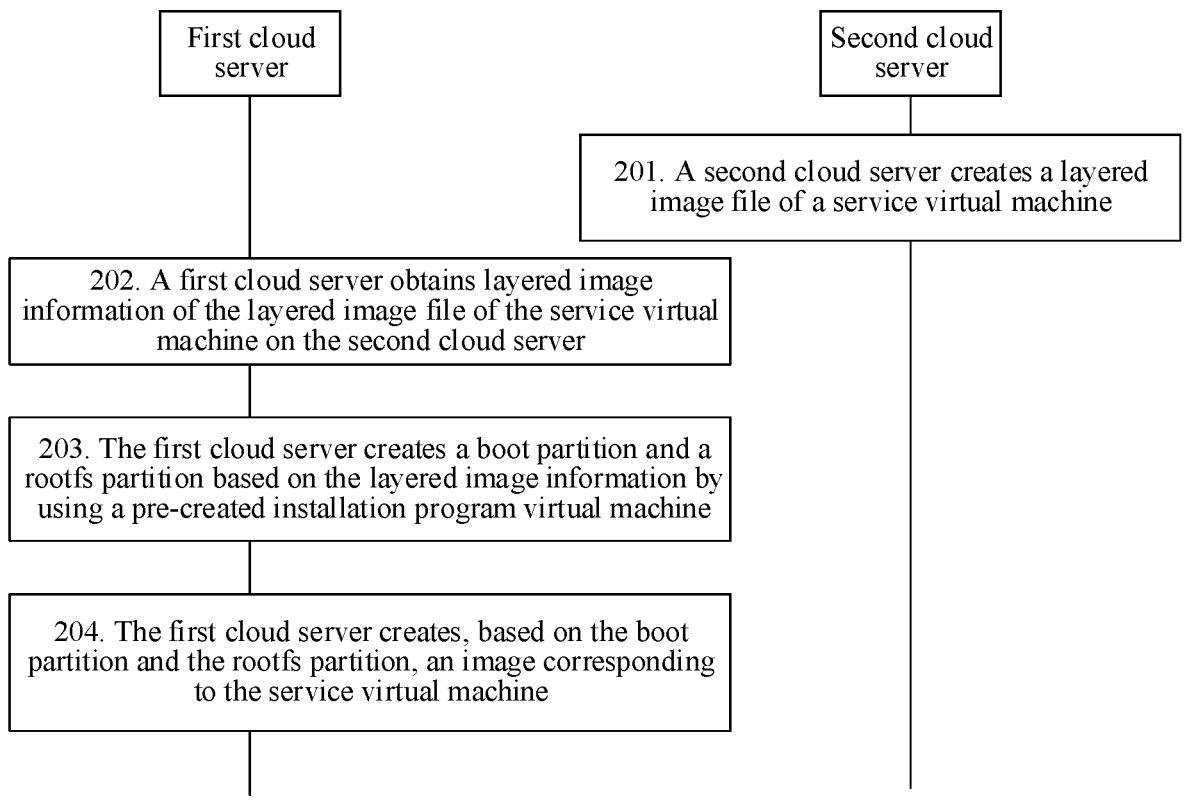
FIG. 2 is a flowchart of a method for managing an image across cloud servers according to an embodiment of this disclosure.

Due to the differences between the public cloud servers and the private cloud servers, in the prior art, when image management across cloud servers is performed, a new image needs to be manually and separately created for different cloud servers. This process consumes a relatively large quantity of resources and has relatively high management costs. To resolve the problem in the prior art, an embodiment of this disclosure provides a method for managing an image across cloud servers. That this disclosure is performed by a first cloud server and a second cloud server is used as an example. Referring to FIG. 2, a procedure of the method provided in this embodiment of this disclosure includes:

Operation 201. The second cloud server creates a layered image file of a service virtual machine.

The service virtual machine is a virtual machine configured to perform a service on the second cloud server. The layered image file includes a kernel description file and an application layer image. The kernel description file includes kernel version description information of the service virtual machine, a module list needing to be loaded by the service virtual machine, a kernel configuration script of the service virtual machine, and the like. A module needing to be loaded includes a hardware driving module and another function module. The application layer image includes a rootfs partition (that is, a root file system partition) and application layer information (that is, attribute information of various applications installed on the service virtual machine, for example, a creation time, a format, and a size) that are used by the service virtual machine.

Figure 3:
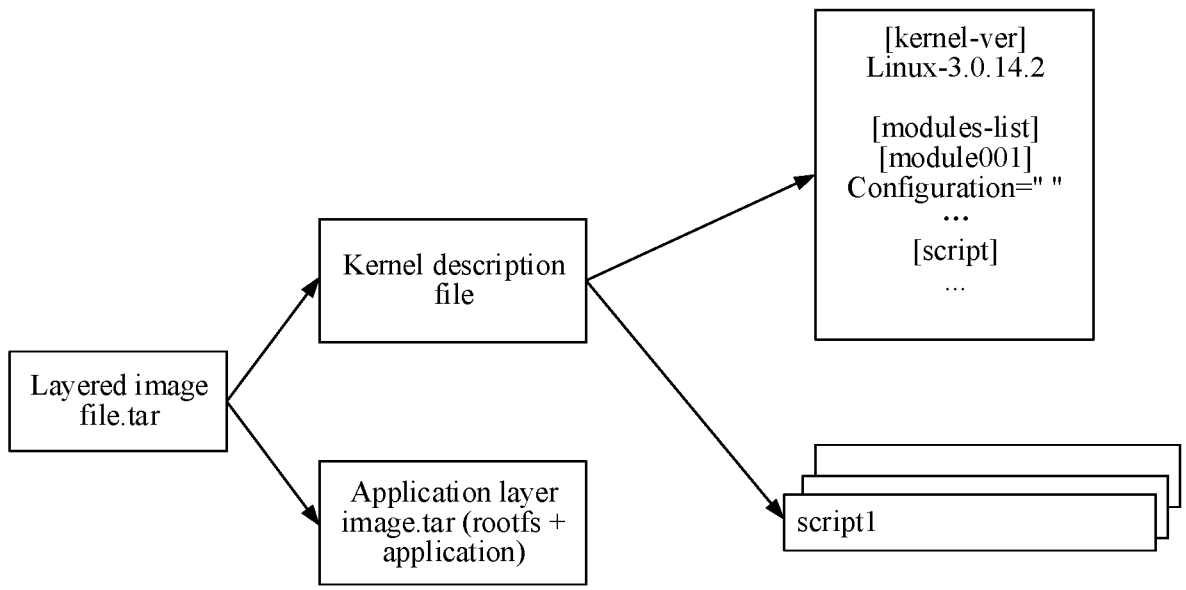
FIG. 3 is a compositional structural diagram of a layered image file according to another embodiment of this disclosure.

FIG. 3 is a compositional structural diagram of a layered image file. It can be learned from FIG. 3 that a format of the layered image file is a compression format of .tar, and the layered image file includes a kernel description file and an application layer image. The kernel description file includes [kernel-ver], [modules-list], [script], and the like. [kernel-ver] indicates kernel version description information of a service virtual machine, and the kernel version description information of the service virtual machine is linux-3.0.14.2; [modules-list] indicates a module list needing to be loaded by the service virtual machine, and the module needing to be loaded by the service virtual machine includes module001 and the like; and [script] indicates a kernel configuration script of the service virtual machine, and the kernel configuration script of the service virtual machine includes script1 and the like.

The second cloud server may create the layered image file of the service virtual machine in the following two manners.

In a first manner, the second cloud server performs analysis processing on the service virtual machine by using a layered image creation application built in the service virtual machine, to create a layered image of the service virtual machine. The layered image creation application is a layered image creation application of the service virtual machine built in the service virtual machine. During specific implementation, refer to operations 20111 to 20115.

Operation 20111. The second cloud server analyzes a kernel module of the service virtual machine by using the layered image creation application, to obtain an analysis result.

The second cloud server reads a file in the kernel module of the service virtual machine by using the layered image creation application. In a file reading process, the second cloud server obtains attribute information of the file, and uses the obtained attribute information of the file as the analysis result. The attribute information of the file includes a file size, a file storage location, a creation time, a modification time, and the like.

Operation 20112. The second cloud server generates a kernel description file based on the analysis result by using the layered image creation application.

The second cloud server obtains, based on the obtained analysis result by using the layered image creation application, information such as the kernel version description information of the service virtual machine, the module list needing to be loaded by the service virtual machine, and the kernel configuration script of the service virtual machine from the analysis result, and packages the obtained information to obtain the kernel description file.

Operation 20113. The second cloud server scans the service virtual machine by using the layered image creation application, to obtain a rootfs partition and application layer information of the service virtual machine.

The rootfs partition may be a rootfs file partition and the like. The second cloud server reads the rootfs file partition and the application layer information of the service virtual machine by using the layered image creation application, and uses the read rootfs file partition and application layer information as the rootfs partition and the application layer information of the service virtual machine.

Operation 20114. The second cloud server generates an application layer image based on the rootfs partition and the application layer information of the service virtual machine by using the layered image creation application.

The second cloud server packages the rootfs partition and the application layer information of the service virtual machine by using the layered image creation application, to obtain the application layer image.

Operation 20115. The second cloud server packages the kernel description file and the application layer image by using the layered image creation application, to obtain a layered image file.

For ease of understanding, the first manner is described in detail below by using FIG. 4 as an example.

Figure 4:
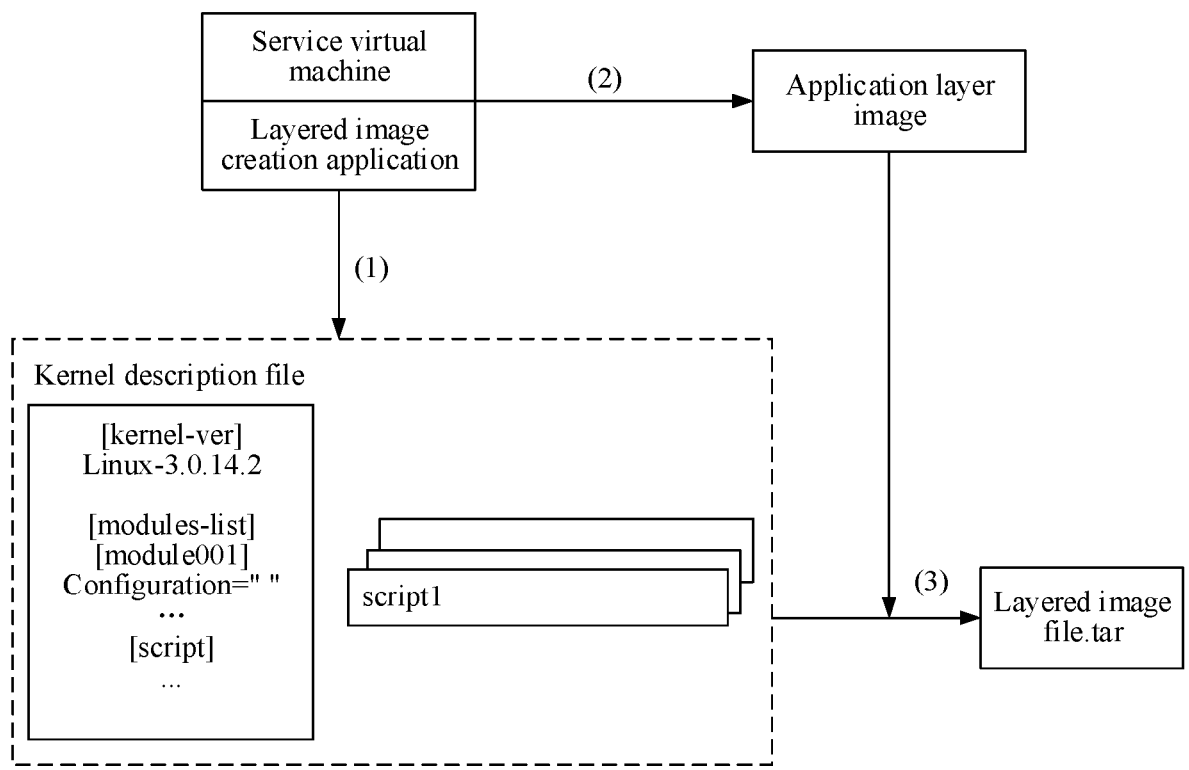
FIG. 4 is a schematic diagram of a creation process of a layered image file according to another embodiment of this disclosure.

Referring to FIG. 4, the second cloud server scans the service virtual machine by using the layered image creation application, and analyzes and processes the service virtual machine, to obtain a kernel description file. The kernel description file is shown in FIG. 3. The second cloud server scans the rootfs partition and the application layer information of the service virtual machine by using the layered image creation application, packages the rootfs partition and the application layer information of the service virtual machine to obtain an application layer image, and further packages the kernel description file and the application layer image to obtain a layered image file.

In a second manner, the second cloud server performs analysis processing on an image file of the service virtual machine by using a layered image conversion application built out of the service virtual machine, to create a layered image of the service virtual machine. The layered image conversion application is a layered image creation application on the second cloud server built out of the service virtual machine. For specific implementation of the process, refer to the following operations 20121 to 20125.

Operation 20121. The second cloud server reads kernel information from the image file of the service virtual machine by using the layered image conversion application, and analyzes the kernel information to obtain an analysis result.

The kernel information includes all information about a kernel module of the service virtual machine, for example, a modification time of the kernel module of the service virtual machine, a creator of the kernel module of the service virtual machine, the kernel version description information of the service virtual machine, the module list needing to be loaded by the service virtual machine, and the kernel configuration script of the service virtual machine.

Operation 20122. The second cloud server generates a kernel description file based on the analysis result by using the layered image conversion application.

The second cloud server obtains, based on the obtained analysis result by using the layered image conversion application, information such as the kernel version description information of the service virtual machine, the module list needing to be loaded by the service virtual machine, and the kernel configuration script of the service virtual machine from the analysis result, and packages the obtained information to obtain the kernel description file.

Operation 20123. The second cloud server reads a rootfs partition and application layer information of the service virtual machine from the image file of the service virtual machine by using the layered image conversion application.

Operation 20124. The second cloud server generates an application layer image based on the rootfs partition and the application layer information of the service virtual machine by using the layered image conversion application.

The second cloud server packages the rootfs partition and the application layer information of the service virtual machine by using the layered image conversion application, to obtain the application layer image.

Operation 20125. The second cloud server packages the kernel description file and the application layer image by using the layered image conversion application, to obtain a layered image file.

For ease of understanding, the second manner is described in detail below by using FIG. 5 as an example.

Figure 5:
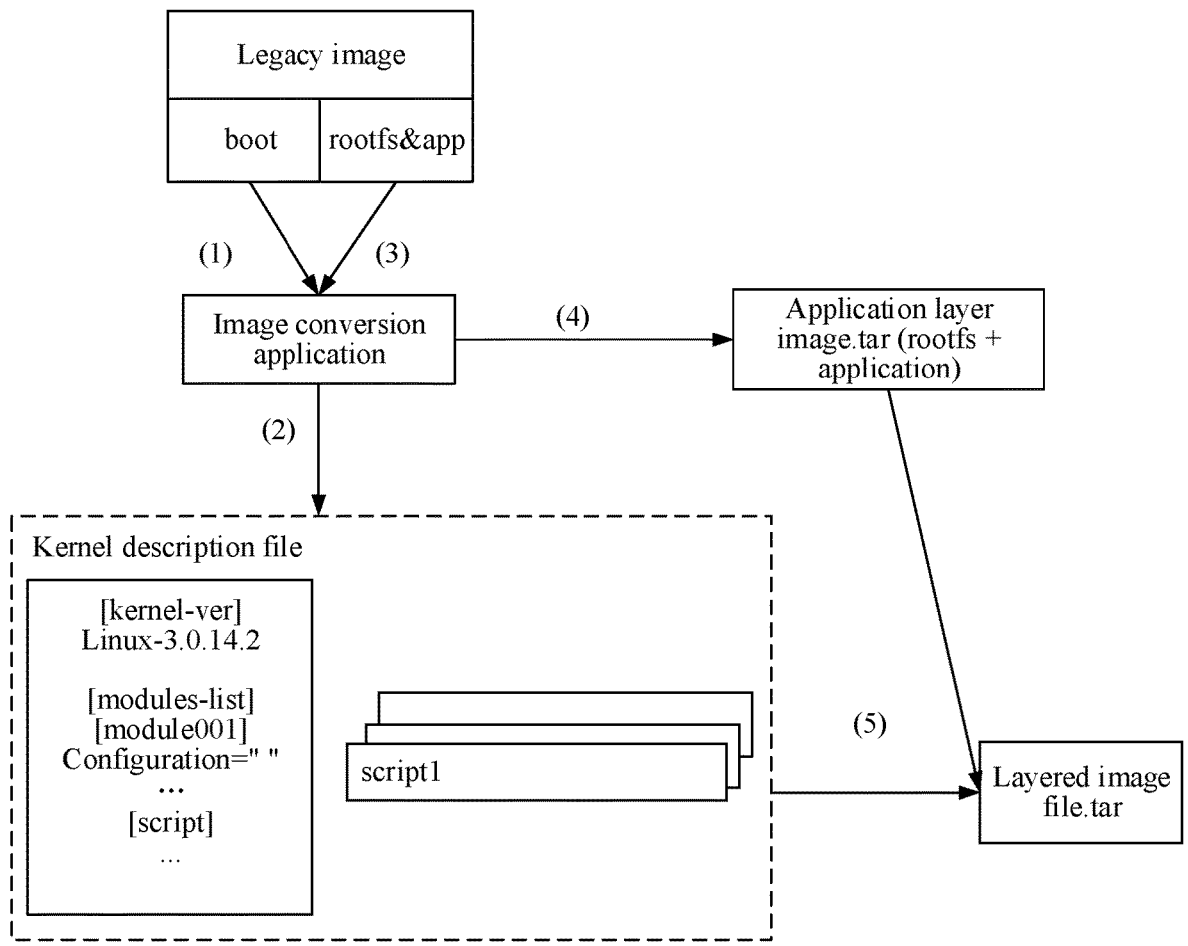
FIG. 5 is a schematic diagram of a creation process of a layered image file according to another embodiment of this disclosure.

Referring to FIG. 5, the second cloud server performs analysis processing on a boot partition in the image file of the service virtual machine by using the layered image conversion application, to obtain a kernel description file. The kernel description file is shown in FIG. 3. Then, the second cloud server performs analysis processing on the rootfs partition and the application layer information in the image file of the service virtual machine by using the layered image conversion application, to obtain an application layer image, and further packages the kernel description file and the application layer image, to obtain a layered image file.

It should be noted that the foregoing uses an example in which analysis processing is performed on the image file of the application virtual machine to obtain the layered image file. Actually, analysis processing may alternatively be performed on a disk file to obtain a layered image file. This process is the same as the second manner, and details are not described herein again.

To help other cloud servers including the first cloud server create an image corresponding to the service virtual machine, after the layered image file is obtained, the second cloud server further performs an operation of storing a layered image. During specific storage, a created layered image may be stored in an image repository. The image repository may be located on the second cloud server, or may be located on the other cloud servers. A storage location of the image repository is not specifically limited in this embodiment.

Operation 202. The first cloud server obtains layered image information of the layered image file of the service virtual machine on the second cloud server.

The layered image information is description information of the layered image file, and the layered image information may be used to obtain the layered image file. Due to service requirements, the first cloud server may obtain the layered image information of the layered image file of the service virtual machine on the second cloud server from the image repository, and further create, based on at least the layered image information, the image corresponding to the service virtual machine.

In this embodiment, based on a use requirement of a user on a first cloud server side, the image corresponding to the service virtual machine created by the first cloud server includes an image service virtual machine and an image file of the service virtual machine. The image service virtual machine is a virtual machine. The first cloud server may obtain a service the same as that of the service virtual machine on the second cloud server by running the image service virtual machine. The image file of the service virtual machine is a file. The first cloud server may install the image service virtual machine on the first cloud server based on the image file of the service virtual machine, to obtain the service the same as that of the service virtual machine on the second cloud server.

Operation 203. The first cloud server creates a boot partition and a rootfs partition based on the layered image information by using a pre-created installer virtual machine.

The boot partition is a kernel module of the service virtual machine and a file used in a boot process. The boot partition may be a boot partition. To reduce a creation time of the image corresponding to the service virtual machine, the method provided in this embodiment further includes: pre-creating an installer virtual machine on the first cloud server, and then automatically creating, based on the installer virtual machine, the image corresponding to the service virtual machine.

A creation process of the installer virtual machine is: The first cloud server obtains an installation package of the installer virtual machine from the image repository, and then installs the installation package of the installer virtual machine according to an installation instruction, to obtain the installer virtual machine.

When the first cloud server creates the boot partition and the rootfs partition based on the pre-created installer virtual machine and the layered image information, the following operations 2031 to 2036 may be performed.

Operation 2031. The first cloud server loads and runs a RAM OS in a virtual disk of the installer virtual machine when the installer virtual machine is started.

Operation 2032. The first cloud server downloads the layered image file based on the layered image information by using the installer virtual machine in a running process of the RAM OS.

Based on the obtained layered image information, the first cloud server may transfer the layered image information to the installer virtual machine by using metadata. The metadata is also referred to as trunk data, and is data used for describing data.

Based on the obtained layered image information, the first cloud server may download the layered image file corresponding to the layered image information from the Internet.

Operation 2033. The first cloud server parses the layered image file by using the installer virtual machine, to obtain a kernel description file and an application layer image.

The first cloud server parses the layered image file by using a layered image parsing application and the installer virtual machine, to obtain the kernel description file and the application layer image.

Operation 2034. The first cloud server downloads a kernel module by using the installer virtual machine based on the kernel description file.

Because the kernel description file indicates related information of the kernel module required by the service virtual machine, the first cloud server downloads, based on the kernel description file and attribute information of the first cloud server by using the installer virtual machine, the kernel module corresponding to the layered image information from the Internet. In this way, the downloaded kernel module satisfies a requirement of the first cloud server and can normally run on the first cloud server. The attribute information includes a server type and the like. The server type includes a public cloud server or a private cloud server. For example, when it is determined, based on the attribute information of the first cloud server, that the first cloud server is a public cloud server, the installer virtual machine of the first cloud server may download, based on the kernel description file, a kernel module corresponding to the public cloud server from the Internet. When it is determined, based on the attribute information of the first cloud server, that the first cloud server is a private cloud server, the installer virtual machine of the first cloud server may download, based on the kernel description file, a kernel module corresponding to the private cloud server from the Internet.

Operation 2035. The first cloud server configures the kernel module by using the installer virtual machine to obtain the boot partition.

Operation 2036. The first cloud server decompresses the application layer image by using the installer virtual machine to obtain the rootfs partition.

Operation 204. The first cloud server creates, based on the boot partition and the rootfs partition, an image corresponding to the service virtual machine.

In this embodiment, the image corresponding to the service virtual machine includes the image service virtual machine and the image file of the service virtual machine. For the image corresponding to the service virtual machine, when the first cloud server creates the image corresponding to the service virtual machine, the following two cases may be included.

In a first case, the image corresponding to the service virtual machine is the image service virtual machine.

In this case, the first cloud server may pre-configure a start mode of the installer virtual machine, and start the installer virtual machine based on the boot partition and the rootfs partition in the preset start mode, to enter a new service operating system, to obtain the image service virtual machine.

In a second case, the image corresponding to the service virtual machine is the image file of the service virtual machine.

In this case, the first cloud server may invoke a specified command from a volume in which the boot partition and the rootfs partition are located, and create the image file of the service virtual machine according to the specified command. The volume is a storage area in a hard disk, and the specified command may be a volume creation command of provider cloud and the like.

Figure 6:
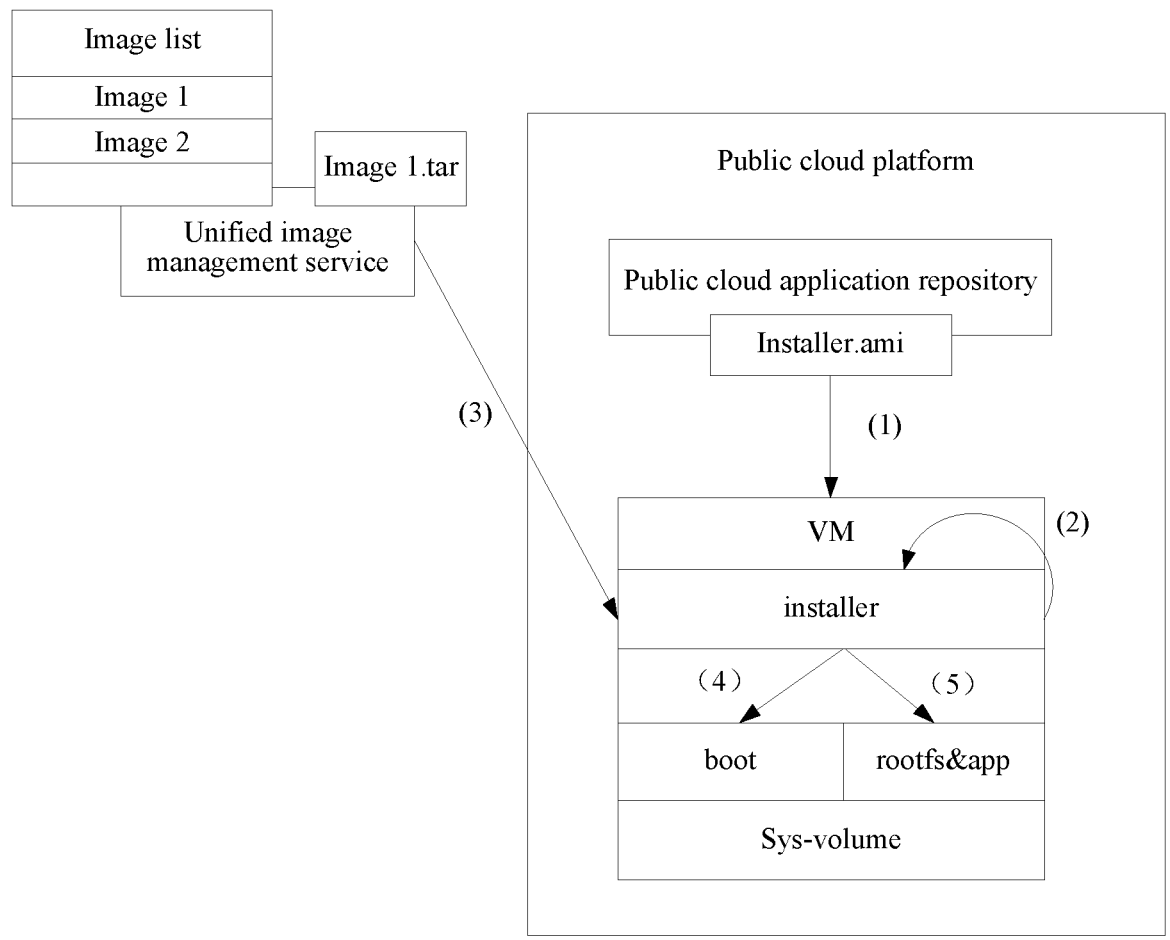
FIG. 6 is a schematic diagram of a creation process of creating a service virtual machine on an Amazon public cloud server by using a layered image file according to another embodiment of this disclosure.

An entire process of creating the image service virtual machine by the first cloud server is described below by using FIG. 6 as an example.

That the first cloud server is an AWS is used as an example. The AWS obtains an installation package of the installer virtual machine from an image repository, and creates, based on the installation package of the installer virtual machine, an installer virtual machine. In addition, the AWS obtains layered image information from the image repository, and transfers the layered image information to the installer virtual machine by using metadata. In a start process of the installer virtual machine, the AWS loads a RAM OS from a virtual disk and runs the RAM OS. Then, the AWS downloads a layered image file based on the layered image information by using the installer virtual machine, and parses the layered image file by using a layered image parsing application, to obtain a kernel description file and an application layer image. Based on the kernel description file, the AWS downloads a corresponding kernel module by using the installer virtual machine, and performs kernel configuration, to obtain a boot partition of the service virtual machine. Then, the AWS parses the application layer image by using the installer virtual machine, to obtain a rootfs file partition. Based on the boot partition and the rootfs file partition, the AWS starts the installer virtual machine in a preset start mode, thereby entering a new service operating system, to obtain the image service virtual machine.

Figure 7:
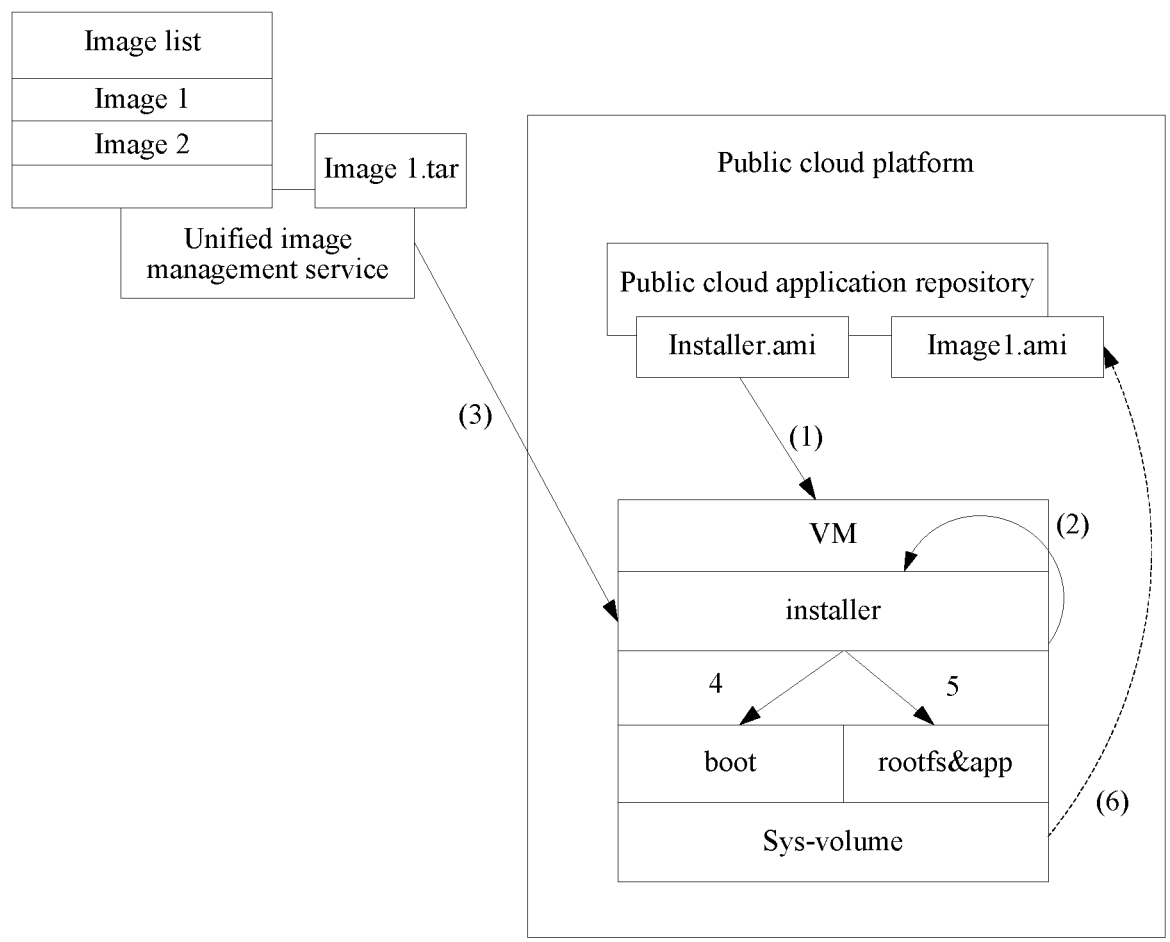
FIG. 7 is a schematic diagram of a creation process of creating an image file of a virtual machine on an Amazon public cloud server by using a layered image file according to another embodiment of this disclosure.

An entire process of creating the image file of the service virtual machine by the first cloud server is described below by using FIG. 7 as an example.

That the first cloud server is an AWS is used as an example. The AWS obtains an installation package of the installer virtual machine from an image repository, and creates, based on the installation package of the installer virtual machine, an installer virtual machine. In addition, the AWS obtains layered image information from the image repository, and transfers the layered image information to the installer virtual machine by using metadata. In a start process of the installer virtual machine, the AWS loads a RAM OS from a virtual disk and runs the RAM OS. Then, the AWS downloads a layered image file based on the layered image information by using the installer virtual machine, and parses the layered image file by using a layered image parsing application, to obtain a kernel description file and an application layer image. Based on the kernel description file, the AWS downloads a corresponding kernel module by using the installer virtual machine, and performs kernel configuration, to obtain a boot partition of the service virtual machine. Then, the AWS parses the application layer image by using the installer virtual machine, to obtain a roofts file partition. The AWS invokes a volume creation command of provider cloud from a volume in which the boot partition and the roofts file partition are located, and creates the image file of the service virtual machine based on the volume creation command of provider cloud.

According to the method provided in this embodiment of this disclosure, no manual operation is required, and the image corresponding to the service virtual machine of the first cloud server is created on the second cloud server by using the pre-created installer virtual machine and the layered image information of the pre-created layered image file on the first cloud server, thereby not only reducing management costs, but also improving management efficiency.

Figure 8:
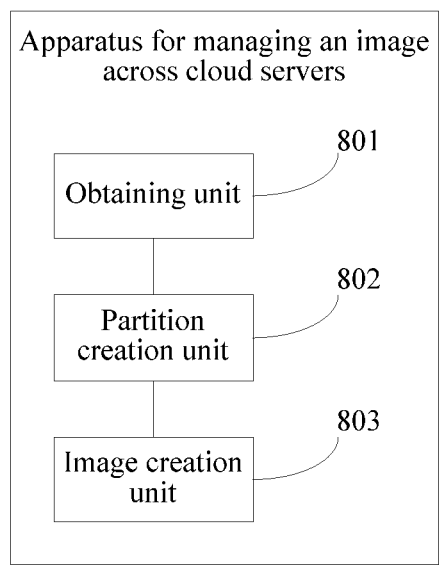
FIG. 8 is a schematic structural diagram of an apparatus for managing an image across cloud servers according to another embodiment of this disclosure.

Referring to FIG. 8, an embodiment of this disclosure provides an apparatus for managing an image across cloud servers. The apparatus is a first cloud server, and the apparatus includes:

an obtaining unit 801, configured to perform operation 202 in FIG. 2;

a partition creation unit 802, configured to perform operation 203 in FIG. 2; and an image creation unit 803, configured to perform operation 204 in FIG. 2.

According to the apparatus provided in this embodiment of this disclosure, no manual operation is required, and the image corresponding to the service virtual machine of the first cloud server is created on the second cloud server by using the pre-created installer virtual machine and the layered image information of the pre-created layered image file on the first cloud server, thereby not only reducing management costs, but also improving management efficiency.

Figure 9:
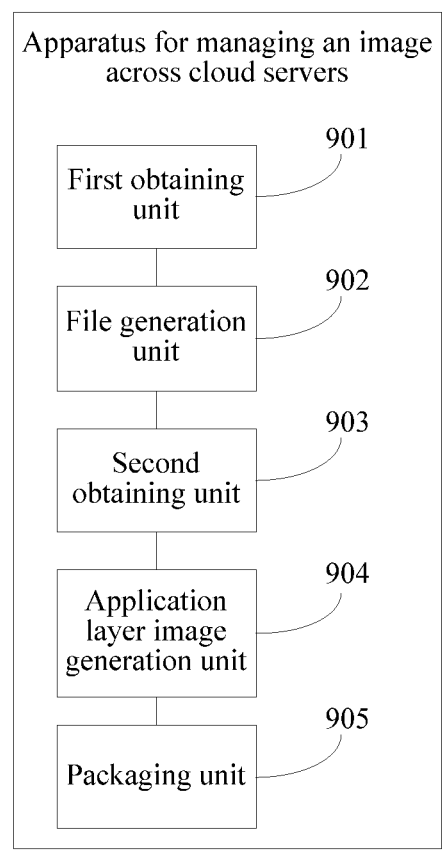
FIG. 9 is a schematic structural diagram of an apparatus for managing an image across cloud servers according to another embodiment of this disclosure.

Referring to FIG. 9, an embodiment of this disclosure provides an apparatus for managing an image across cloud servers. The apparatus is a second cloud server, and the apparatus includes:

a first obtaining unit 901, configured to perform operation 201 in FIG. 2;

a file generation unit 902, configured to perform operation 201 in FIG. 2;

a second obtaining unit 903, configured to perform operation 201 in FIG. 2;

an application layer image generation unit 904, configured to perform step 201 in FIG. 2; and a packaging unit 905, configured to perform operation 201 in FIG. 2.

According to the apparatus provided in this embodiment of this disclosure, the layered image file of the service virtual machine is pre-created, so that the second cloud server can create, based on the layered image file, the image corresponding to the service virtual machine. In this process, no manual operation is required, thereby not only reducing management costs, but also improving management efficiency.

Figure 10:
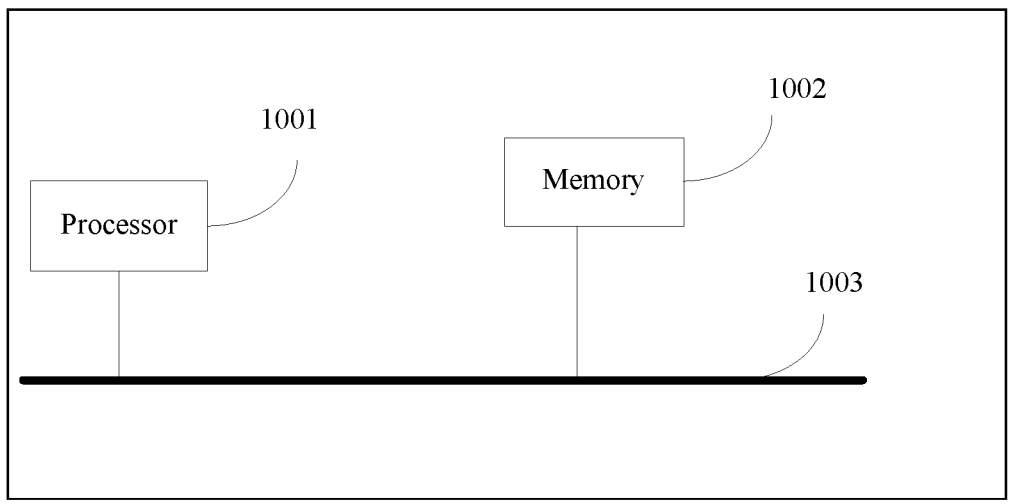
FIG. 10 is a schematic structural diagram of a server for managing an image across cloud servers according to another embodiment of this disclosure.

Referring to FIG. 10, an embodiment of this disclosure provides a server for managing an image across cloud servers. The server is a first cloud server and includes: a processor 1001, a memory 1002, and a bus 1003. The memory 1002 and the processor 1001 are connected by using the bus 1003. The memory 1002 is configured to store an executable instruction of the processor 1001.

The processor 1001 invokes, by using the bus 1003, the executable instruction stored in the memory 1002, to perform operations 202, 203, and 204 in FIG. 2.

The foregoing uses an example in which the server for managing an image across cloud servers is the first cloud server. Actually, the server for managing an image across cloud servers may alternatively be a second cloud server. When the server for managing an image across cloud servers is the second cloud server, the server includes: a processor 1001, a memory 1002, and a bus 1003. The memory 1002 and the processor 1001 are connected to by using the bus 1003. The memory 1002 is configured to store an executable instruction of the processor 1001.

The processor 1001 invokes, by using the bus 1003, a computer instruction stored in the memory 1002, to perform operation 201 in FIG. 2.

According to the server in this embodiment of this disclosure, no manual operation is required, and the image corresponding to the service virtual machine of the first cloud server is created on the second cloud server by using the pre-created installer virtual machine and the layered image information of the pre-created layered image file on the first cloud server, thereby not only reducing management costs, but also improving management efficiency.

It should be noted that, when the apparatus and the server for managing an image across cloud servers provided in the foregoing embodiments perform image management across cloud servers, only the foregoing division of function modules is used as an example for description. During actual application, the foregoing functions may be allocated to different function modules for implementation as required. To be specific, the internal structures of the apparatus and the server for managing an image across cloud servers are divided into different function modules, to implement all or a part of the functions described above. In addition, the embodiments of the apparatus and the server for managing an image across cloud servers and the method for managing an image across cloud servers provided in the foregoing embodiments belong to a same concept. For a specific implementation process, refer to the method embodiments, and details are not described herein again.

A person of ordinary skill in the art may understand that all or some of operations of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of this disclosure, and are not intended to limit this disclosure. Any modification, equivalent replacement, or improvement made without departing from the spirit and principle of this disclosure should fall within the protection scope of this disclosure.

What is claimed is:

1. A method for managing an image across cloud servers, wherein the method is applied to a first cloud server, and the method comprises:
   obtaining layered image information of a layered image file of a service virtual machine on a second cloud server;
   creating a boot partition and a rootfs partition based on the layered image information by using a pre-created installer virtual machine; and
   creating, based on the boot partition and the rootfs partition, an image corresponding to the service virtual machine.

2. The method according to claim 1, wherein the creating a boot partition and a rootfs partition based on the layered image information by using a pre-created installer virtual machine comprises:
   loading and running a RAM OS in a virtual disk of the installer virtual machine when the installer virtual machine is started;
   downloading the layered image file based on the layered image information by using the installer virtual machine in a running process of the RAM OS;
   parsing the layered image file by using the installer virtual machine, to obtain a kernel description file and an application layer image;
   downloading a kernel module by using the installer virtual machine based on the kernel description file;
   configuring the kernel module by using the installer virtual machine to obtain the boot partition; and
   decompressing the application layer image by using the installer virtual machine to obtain the rootfs partition.

3. The method according to claim 1, wherein the image corresponding to the service virtual machine comprises an image service virtual machine; and
   the creating, based on the boot partition and the rootfs partition, an image corresponding to the service virtual machine comprises:
   starting the installer virtual machine based on the boot partition and the rootfs partition in a preset start mode, to obtain the image service virtual machine.

4. The method according to claim 1, wherein the image corresponding to the service virtual machine comprises an image file of the service virtual machine; and
   the creating, based on the boot partition and the rootfs partition, an image corresponding to the service virtual machine comprises:
   invoking a specified command from a volume in which the boot partition and the rootfs partition are located; and
   creating the image file of the service virtual machine according to the specified command.

5. A method for managing an image across cloud servers, wherein the method is applied to a second cloud server, and the method comprises:
   obtaining an analysis result for a kernel module of a service virtual machine;
   generating a kernel description file based on the analysis result;
   obtaining a rootfs partition and application layer information of the service virtual machine;
   generating an application layer image based on the rootfs partition and the application layer information of the service virtual machine; and
   packaging the kernel description file and the application layer image to obtain a layered image file, wherein the layered image file is used by a first cloud server to create an image corresponding to the service virtual machine.

6. The method according to claim 5, wherein the obtaining an analysis result for a kernel module of a service virtual machine comprises:
   analyzing the kernel module of the service virtual machine in a running process of the service virtual machine, to obtain the analysis result; or
   reading kernel information from the image file of the service virtual machine and analyzing the kernel information, to obtain the analysis result.

7. The method according to claim 5, wherein the obtaining a rootfs partition and application layer information of the service virtual machine comprises:
   scanning the service virtual machine that is running, to obtain the rootfs partition and the application layer information of the service virtual machine; or
   reading the rootfs partition and the application layer information of the service virtual machine from the image file of the service virtual machine.

8. A server for managing an image across cloud servers, comprising: a processor, a memory, and a bus, wherein the memory and the processor are connected by using the bus; and the memory is configured to store an executable instruction of the processor; and
   the processor invokes, by using the bus, the executable instruction stored in the memory, to perform the following operations:
   obtaining layered image information of a layered image file of a service virtual machine on a second cloud server;
   creating a boot partition and a rootfs partition based on the layered image information by using a pre-created installer virtual machine; and
   creating, based on the boot partition and the rootfs partition, an image corresponding to the service virtual machine.

9. The server according to claim 8, wherein the processor is further configured to: load and run a RAM OS in a virtual disk of the installer virtual machine when the installer virtual machine is started; download the layered image file based on the layered image information by using the installer virtual machine in a running process of the RAM OS; parse the layered image file by using the installer virtual machine, to obtain a kernel description file and an application layer image; download a kernel module by using the installer virtual machine based on the kernel description file; configure the kernel module by using the installer virtual machine to obtain the boot partition; and decompress the application layer image by using the installer virtual machine to obtain the rootfs partition.

10. The server according to claim 8, wherein the image corresponding to the service virtual machine comprises an image service virtual machine; and
    the processor is further configured to start the installer virtual machine based on the boot partition and the rootfs partition in a preset start mode, to obtain the image service virtual machine.

11. The server according to claim 8, wherein the image corresponding to the service virtual machine comprises an image file of the service virtual machine; and
    the processor is further configured to: invoke a specified command from a volume in which the boot partition and the rootfs partition are located; and create the image file of the service virtual machine according to the specified command.

\* \* \* \* \*